(No Model.)
E. H. GODSHALK.
FUR CUTTING MACHINE.
No. 275,640. Patented Apr. 10, 1883.
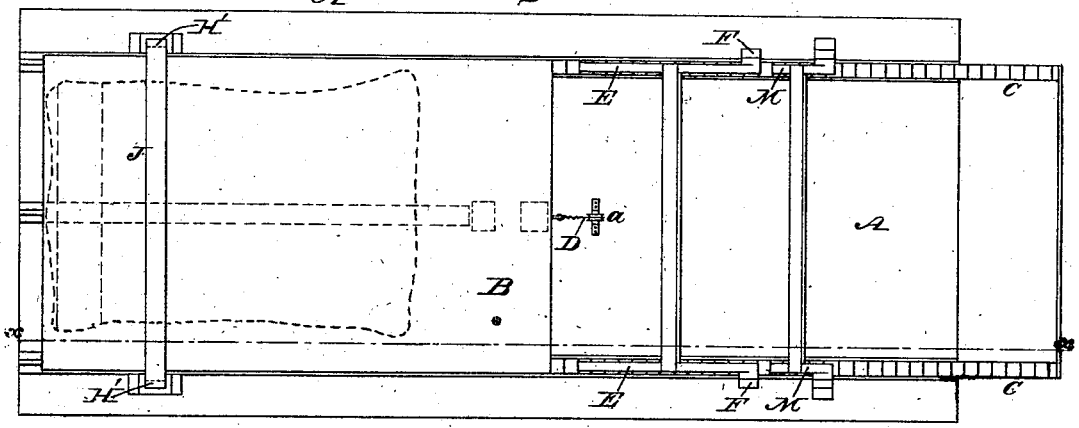
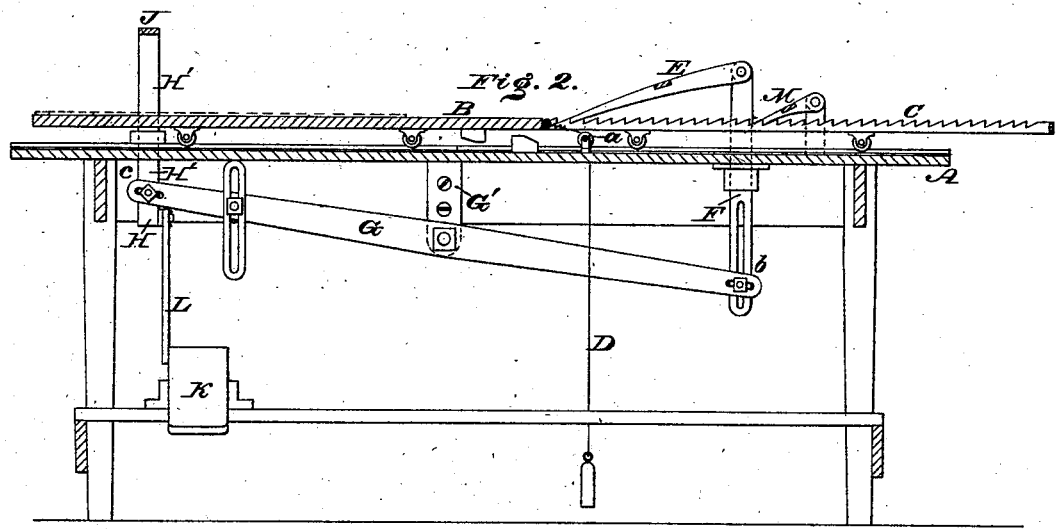
WITNESSES:
L. Douville
W. F. Kircher
INVENTOR:
Edward H. Godshalk,
BY John A. Wiedersheim.
ATTORNEY.
N. PETERS. Photo-Lithographer. Washington, D. C.

United States Patent Office.

EDWARD H. GODSHALK, OF PHILADELPHIA, PENNSYLVANIA.

FUR-CUTTING MACHINE.

SPECIFICATION forming part of Letters Patent No. 275,640, dated April 10, 1883.

Application filed January 29, 1883. (No model.)

*To all whom it may concern:*

Be it known that I, EDWARD H. GODSHALK, a citizen of the United States, residing in the city and county of Philadelphia, State of Pennsylvania, have invented a new and useful Improvement in Machines for Cutting Fur, &c., which improvement is fully set forth in the following specification and accompanying drawings, in which—

Figure 1 is a top or plan view of a fur-cutting machine embodying my invention. Fig. 2 is a longitudinal vertical section thereof in line *x x*, Fig. 1.

Similar letters of reference indicate corresponding parts in the two figures.

My invention consists of a cutting-machine having a carriage on which the fur may be spread, means for advancing said carriage, and a clamp for holding the fur while being cut, said clamp also serving as a guide for the knife, whereby fur, &c., may be uniformly cut in a quick and easy manner, as will be hereinafter set forth.

Referring to the drawings, A represents a table, on the top of which is mounted a carriage, B, for holding the fur to be cut, said carriage having rollers, pulleys, or wheels, which run on tracks secured to the top of the table, whereby the carriage may be guided true and moved with ease.

To the rear end of the carriage are attached horizontally-arranged rack-bars C and a weighted cord, D, which passes over a pulley, *a*, suitably mounted on the table A, and is adapted for causing the return of the carriage to its normal position or starting-point.

E represents pawls or dogs, which are hung on the upper end of vertically-moving arms F, which are passed through the top of the table, and have their lower ends pivoted to a horizontal swinging arm, G, beneath said top, said arm being mounted on a bearing, G', which is secured to the table. To the end of the arm G opposite to the arms F is attached a frame, H, the side pieces, H', whereof are passed through openings or guides in the table, and are connected at top by a transversely-extending bar, J, which overhangs the carriage B.

K represents a treadle, whose bearings are on the lower portion of the table A; and L represents the treadle-lever, the upper end whereof is pivoted to the frame H, or may be pivoted to the front end of the arm G.

To the top of the table, at the rear of the pawls or dogs E, are pivoted check-pawls M, the object whereof is to prevent the return of the carriage B.

When the parts are in their normal position, as shown in the drawings, the bar J is raised above the carriage B. The skin is spread on the carriage, with one edge at or near the front end thereof, so that said edge, if irregular, is just in advance of the front edge of the bar J. The treadle K is operated, and as the arms F rise the dogs E ride back over the rack-bar C and engage anew with the teeth thereof. The bar J is simultaneously operated or lowered, and when at its lowest point bears against the portion of the skin beneath it and firmly holds or clamps said portion to the carriage. The front edge of the bar J now serves as a ruler or guide, and a knife is run through the fur along said front edge of the bar, whereby the edge of fur is trimmed. The treadle is let go, and as the arms F are lowered the dogs E advance the carriage the required extent corresponding to the width of the strip to be cut. Simultaneously with the operation of the arms F the bar J is raised, thus permitting the advance of the carriage. The treadle is again operated, whereby the bar is lowered against the skin, and the dogs E ride back to take fresh hold of the carriage. The knife is now applied and run through the skin along the front edge of the bar J, thus removing a piece or strip of the skin of the required width, after which the other operations are repeated, the result being the severing of the skin in pieces of uniform width, it being observed that the bar J serves both as a clamp and guide. When the skin has been fully cut, the dogs E and pawls M are raised, the carriage B under the action of the weighted cord D returns to its first position, and a fresh skin may be spread thereon.

The distance that the carriage B is advanced may be regulated by increasing or decreasing the throw of the dogs E, so that strips of different width may be cut. For this purpose I provide a slotted or adjustable connection for the arm G and arms F, as at *b*, or for the arm G and frame H, as at c; but the same result may be accomplished by rendering the connection of the bearing G' and arm G adjustable, or the employment of stops suitably applied.

Having thus described my invention, what I claim as new, and desire to secure by Letters Patent, is—

1. In a cutting-machine, a carriage and a clamping-bar connected therewith by a balance lever or arm, which simultaneously operate said carriage and bar by mechanism substantially as described.

2. The carriage B and clamping-bar J, in combination with the rack-bar C, dog E, arm F, frame H, and connecting arm or lever G, substantially as and for the purpose set forth.

3. The carriage B and clamping-bar J, in combination with the rack-bar C, dog E, arm F, lever or arm G, frame H, check-pawl M, and weighted cord D, substantially as and for the purpose set forth.

E. H. GODSHALK.

Witnesses:
B. F. ROHRER,
H. R. FEGELEY.